United States Patent
Miyahara et al.

(10) Patent No.: US 11,719,180 B1
(45) Date of Patent: Aug. 8, 2023

(54) ABNORMALITY DIAGNOSIS APPARATUS FOR INTERNAL COMBUSTION ENGINE

(71) Applicant: TOYOTA JIDOSHA KABUSHIKI KAISHA, Toyota (JP)

(72) Inventors: Hideki Miyahara, Miyoshi (JP); Akihiro Katayama, Toyota (JP); Hirotaka Nakayama, Miyoshi (JP); Yuki Ikejiri, Nishio (JP); Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/069,487

(22) Filed: Dec. 21, 2022

(30) Foreign Application Priority Data

Mar. 8, 2022 (JP) .................................. 2022-035083

(51) Int. Cl.
| | |
|---|---|
| *F01N 11/00* | (2006.01) |
| *F02D 41/22* | (2006.01) |
| *G07C 5/08* | (2006.01) |
| *F02D 41/02* | (2006.01) |
| *F02D 41/38* | (2006.01) |

(52) U.S. Cl.
CPC .............. *F02D 41/22* (2013.01); *F01N 11/00* (2013.01); *F02D 41/0235* (2013.01); *F02D 41/38* (2013.01); *G07C 5/0808* (2013.01); *G07C 5/0816* (2013.01)

(58) Field of Classification Search
CPC ....... F02D 41/0235; F02D 41/22; F01N 11/00
USPC ..................................................... 73/114.04
See application file for complete search history.

(56) References Cited

U.S. PATENT DOCUMENTS

| | | | | |
|---|---|---|---|---|
| 5,956,941 | A * | 9/1999 | Cullen | F01N 3/0842 60/277 |
| 6,338,326 | B1 * | 1/2002 | Ebeling | G01M 15/104 123/198 F |
| 7,831,376 | B2 * | 11/2010 | Binder | F02D 41/1498 123/436 |
| 2021/0107452 | A1 | 4/2021 | Nose et al. | |

(Continued)

FOREIGN PATENT DOCUMENTS

| | | |
|---|---|---|
| JP | 2000-73850 A | 3/2000 |
| JP | 2021-60027 A | 4/2021 |

(Continued)

*Primary Examiner* — Erick R Solis
(74) *Attorney, Agent, or Firm* — Oblon, McClelland, Maier & Neustadt, L.L.P.

(57) ABSTRACT

An abnormality diagnosis apparatus performs a stop process for stopping the supply of fuel to at least one of a plurality of cylinders and supplying fuel to the other cylinders or cylinder. The abnormality diagnosis apparatus performs a catalyst abnormality diagnosis process for diagnosing that there is an abnormality in an exhaust gas control apparatus, based on the value of a first misfire counter indicating the number of times of detection of a misfire during the operation of an internal combustion engine by a prescribed amount. In the catalyst abnormality diagnosis process, the abnormality diagnosis apparatus diagnoses that there is an abnormality in the exhaust gas control apparatus with the value of the first misfire counter being smaller when the stop process is performed than when the stop process is not performed during the operation of the internal combustion engine by the prescribed amount.

5 Claims, 7 Drawing Sheets

(56) References Cited

U.S. PATENT DOCUMENTS

| | | |
|---|---|---|
| 2022/0099041 A1 | 3/2022 | Anzawa et al. |
| 2022/0099529 A1 | 3/2022 | Anzawa |

FOREIGN PATENT DOCUMENTS

| | | |
|---|---|---|
| JP | 2022-55507 A | 4/2022 |
| JP | 2022-55508 A | 4/2022 |

\* cited by examiner

FIG. 7

| | | KL | | | | | |
|---|---|---|---|---|---|---|---|
| | | 15 | 45 | 60 | 75 | 85 | 100 |
| NE | 1000 | 76.1 | 51.1 | 43.4 | 39.4 | 36.7 | 32.7 |
| | 2000 | 55.1 | 43.9 | 39.9 | 34.8 | 33.3 | 31.1 |
| | 3200 | 48.2 | 37.4 | 35.7 | 29.3 | 25.0 | 25.0 |
| | 4000 | 42.8 | 34.2 | 29.9 | 26.5 | 25.8 | 25.0 |
| | 4800 | 41.1 | 31.5 | 27.2 | 25.0 | 26.8 | 32.1 |
| | 5600 | 37.4 | 25.8 | 25.0 | 25.0 | 25.3 | 28.9 |
| | 6600 | 30.5 | 25.0 | 25.0 | 25.0 | 26.6 | 29.8 |

FIG. 8

| | | KL | | | | | |
|---|---|---|---|---|---|---|---|
| | | 15 | 45 | 60 | 75 | 85 | 100 |
| NE | 1000 | 43.1 | 18.1 | 10.4 | 6.4 | 5.0 | 5.0 |
| | 2000 | 22.1 | 10.9 | 6.9 | 5.0 | 5.0 | 5.0 |
| | 3200 | 15.2 | 5.0 | 5.0 | 5.0 | 5.0 | 5.0 |
| | 4000 | 9.8 | 5.0 | 5.0 | 5.0 | 5.0 | 5.0 |
| | 4800 | 8.1 | 5.0 | 5.0 | 5.0 | 5.0 | 5.0 |
| | 5600 | 5.0 | 5.0 | 5.0 | 5.0 | 5.0 | 5.0 |
| | 6600 | 5.0 | 5.0 | 5.0 | 5.0 | 5.0 | 5.0 |

ABNORMALITY DIAGNOSIS APPARATUS FOR INTERNAL COMBUSTION ENGINE

CROSS-REFERENCE TO RELATED APPLICATION

This application claims priority to Japanese Patent Application No. 2022-035083 filed on Mar. 8, 2022, incorporated herein by reference in its entirety.

BACKGROUND

1. Technical Field

This disclosure relates to an abnormality diagnosis apparatus for an internal combustion engine.

2. Description of Related Art

In Japanese Unexamined Patent Application Publication No. 2021-60027 (JP 2021-60027 A), there is disclosed a hybrid electric vehicle equipped with an engine having a plurality of cylinders and a motor-generator. This hybrid electric vehicle is provided with an exhaust gas control apparatus that controls the composition of exhaust gas discharged from the cylinders. A catalyst in the exhaust gas control apparatus manifests an ability to control the composition of exhaust gas at an activation temperature. Therefore, in the hybrid electric vehicle disclosed in JP 2021-60027 A, the catalyst is warmed up, namely, heated up to the activation temperature when the temperature of the catalyst is low.

A control device disclosed in JP 2021-60027 A performs a stop process for stopping the supply of fuel to one or some of the cylinders of the engine and supplying fuel to the other cylinders or cylinder when the catalyst needs to be warmed up. Thus, the exhaust gas control apparatus is supplied with oxygen through the cylinder or cylinders to which the supply of fuel is stopped. An oxidation reaction in the catalyst is then promoted to raise the temperature of the catalyst. In this manner, the control device can promote the warm-up of the catalyst by performing the stop process.

An abnormality diagnosis apparatus for an internal combustion engine detects the occurrence of a misfire in each of cylinders, based on information on fluctuations in engine rotational speed. Furthermore, the abnormality diagnosis apparatus determines whether or not the frequency of the occurrence of a misfire is equal to or higher than a threshold every time the number of times of rotation of a crankshaft reaches the prescribed number of times of rotation. The abnormality diagnosis apparatus then diagnoses that there is a combustion abnormality when the frequency of the occurrence of a misfire is equal to or higher than the threshold.

In Japanese Unexamined Patent Application Publication No. 2000-73850 (JP 2000-73850 A), there is disclosed an abnormality diagnosis apparatus that stops detecting the occurrence of a misfire in at least one cylinder to which the supply of fuel is stopped and carries out detection of the occurrence of a misfire only in the other cylinders or cylinder when such a stop process is performed.

SUMMARY

By the way, when a misfire occurs, the air-fuel mixture that has passed through the cylinders is introduced into the exhaust gas control apparatus. Therefore, an oxidation reaction is triggered to raise the temperature of the exhaust gas control apparatus excessively. Thus, the abnormality diagnosis apparatus diagnoses that damage is accumulated in the exhaust gas control apparatus, based on the frequency of the occurrence of a misfire, as a diagnosis on an abnormality in the exhaust gas control apparatus. Apart from the diagnosis on a combustion abnormality as described above, the abnormality diagnosis apparatus carries out such a diagnosis on an abnormality in the exhaust gas control apparatus.

Incidentally, in the case where the stop process is performed as described above, air is introduced through the stopped cylinder or cylinders, so the temperature of the exhaust gas control apparatus further rises. In order to adequately carry out a diagnosis on an abnormality in the exhaust gas control apparatus, the influence of this stop process also needs to be reflected by the diagnosis.

Means for solving the foregoing problem and operations and effects thereof will be described hereinafter.

With a view to solving the foregoing problem, an abnormality diagnosis apparatus for an internal combustion engine that has a plurality of cylinders and that allows the performance of a stop process in which the supply of fuel to at least one of the cylinders is stopped to supply oxygen to an exhaust gas control apparatus and fuel is supplied to the other cylinders or cylinder is applied to the internal combustion engine. The abnormality diagnosis apparatus performs a misfire detection process in which the occurrence of a misfire in each of the cylinders is detected based on information on fluctuations in an engine rotational speed, a count process in which a value of a misfire counter indicating the number of times of detection of a misfire through the misfire detection process is calculated, and a catalyst abnormality diagnosis process in which the occurrence of an abnormality in the exhaust gas control apparatus is diagnosed based on the value of the misfire counter indicating the number of times of detection of a misfire during the operation of the internal combustion engine by a prescribed amount. The catalyst abnormality diagnosis process is configured to diagnose that there is an abnormality in the exhaust gas control apparatus with the value of the misfire counter being smaller when the stop process is performed during the operation of the internal combustion engine by the prescribed amount than when the stop process is not performed during the operation of the internal combustion engine by the prescribed amount.

In the case where the stop process is performed, oxygen is introduced through the stopped cylinder or cylinders, so the temperature of the exhaust gas control apparatus rises due to an oxidation reaction. Therefore, more damage is accumulated in the exhaust gas control apparatus through overheating than in the case where the stop process is not performed, even when the number of times of the occurrence of a misfire is small.

The abnormality diagnosis apparatus diagnoses that there is an abnormality in the exhaust gas control apparatus with the value of the misfire counter being smaller when the stop process is performed than when the stop process is not performed. That is, the abnormality diagnosis apparatus can perform the catalyst abnormality diagnosis process while reflecting the damage resulting from overheating through the stop process.

The abnormality diagnosis apparatus for the internal combustion engine according to one aspect may carry out a correction of removing the number of times of the stop of fuel supply through the stop process from the value of the misfire counter indicating the number of times of detection of a misfire during the operation of the internal combustion engine by the prescribed amount, when the stop process is performed during the operation of the internal combustion engine by the prescribed amount, and may calculate an abnormality determination threshold as a value that decreases as the number of times of the stop of fuel supply through the stop process during the operation of the internal combustion engine by the prescribed amount increases. Moreover, in the catalyst abnormality diagnosis process, the abnormality diagnosis apparatus may diagnose that there is an abnormality in the exhaust gas control apparatus when the corrected value of the misfire counter is larger than the abnormality determination threshold.

The abnormality diagnosis apparatus diagnoses that there is an abnormality in the exhaust gas control apparatus when the value of the misfire counter indicating the number of times of the occurrence of a misfire in a combustion stroke in which fuel is supplied is larger than the abnormality determination threshold. The amount of damage accumulated in the exhaust gas control apparatus increases as the number of times of the stop of fuel supply through the stop process during the operation of the internal combustion engine by the prescribed amount increases. Thus, the abnormality diagnosis apparatus calculates the abnormality determination threshold as a value that decreases as the number of times of the stop of fuel supply increases. Thus, the abnormality diagnosis apparatus can realize the catalyst abnormality diagnosis process reflecting the accumulation of damage corresponding to the number of times of the stop of fuel supply.

Incidentally, as one aspect of calculating the abnormality determination threshold as a value that decreases as the number of times of the stop of fuel supply through the stop process during the operation of the internal combustion engine by the prescribed amount increases, it is possible to adopt an aspect in which the abnormality determination threshold is a value obtained by multiplying an average permissible misfire rate obtained by averaging permissible misfire rates calculated based on an engine load factor and an engine rotational speed upon every arrival of a compression top dead center during the operation of the internal combustion engine by the prescribed amount, by the number of times of the emergence of a combustion stroke in which fuel is supplied during the operation of the internal combustion engine by the prescribed amount, and each of the permissible misfire rates calculated based on the engine load factor and the engine rotational speed is made lower when the stop process is performed than when the stop process is not performed.

The abnormality diagnosis apparatus for the internal combustion engine according to another aspect may perform a misfire abnormality diagnosis process in which the occurrence of a misfire abnormality is diagnosed when a value of a second misfire counter that is the misfire counter indicating the number of times of detection of a misfire during the operation of the internal combustion engine by a second prescribed amount is larger than a misfire determination threshold, in addition to the catalyst abnormality diagnosis process. Moreover, in the misfire abnormality diagnosis process, the abnormality diagnosis apparatus may carry out a correction of removing the number of times of the stop of fuel supply through the stop process from the value of the second misfire counter, and a correction of multiplying the misfire determination threshold by a ratio of the number of times of fuel supply to a sum of the numbers of times of the arrival of a compression top dead center in all the cylinders during the operation of the internal combustion engine by the second prescribed amount, when the stop process is performed during the operation of the internal combustion engine by the second prescribed amount, and may diagnose that the misfire abnormality has occurred when the corrected value of the second misfire counter is larger than the corrected misfire determination threshold.

The abnormality diagnosis apparatus performs the misfire abnormality diagnosis process in addition to the catalyst abnormality diagnosis process. When the stop process is performed, a misfire may be erroneously detected on the assumption that there is a misfire in the cylinder or cylinders to which the supply of fuel is stopped. This erroneous detection results in a determination that the frequency of the occurrence of a misfire is high, and leads to an erroneous diagnosis that there is a misfire abnormality. In contrast, the abnormality diagnosis apparatus carries out the correction of removing the number of times of the stop of fuel supply from the value of the second misfire counter counted through the count process, and the correction of reducing the misfire determination threshold in accordance with the ratio of actual fuel supply in the misfire abnormality diagnosis process, when the stop process is performed. Thus, the abnormality diagnosis apparatus can adequately carry out a diagnosis on a misfire abnormality while reflecting that there is at least one cylinder to which the supply of fuel is stopped.

In the abnormality diagnosis apparatus for the internal combustion engine according to still another aspect, a quotient obtained by dividing a second abnormality determination threshold by a first abnormality determination threshold may be smaller than a quotient obtained by dividing a second misfire determination threshold by a first misfire determination threshold, in a case where the first abnormality determination threshold represents the abnormality determination threshold when the stop process is not performed, the second abnormality determination threshold represents the abnormality determination threshold when the stop process is performed, the first misfire determination threshold represents the misfire determination threshold when the stop process is not performed, and the second misfire determination threshold represents the misfire determination threshold when the stop process is performed.

In the misfire abnormality diagnosis process, a diagnose on a misfire abnormality may be carried out with the cylinder or cylinders to which the supply of fuel is stopped excluded from targets for detection of a misfire. On the other hand, the catalyst abnormality diagnosis process needs to reflect the accumulation of damage in the exhaust gas control apparatus resulting from the generation of heat through the supply of oxygen from the cylinder or cylinders to which the supply of fuel is stopped, in addition to excluding the cylinder or cylinders to which the supply of fuel is stopped from the targets for detection of a misfire.

The state where the quotient obtained by dividing the second abnormality determination threshold by the first abnormality determination threshold is smaller than the quotient obtained by dividing the second misfire determination threshold by the first misfire determination threshold indicates that the degree of reduction in the abnormality determination thresholds is higher than the degree of reduction in the misfire determination thresholds by a larger value when the stop process is performed than when the stop process is not performed.

That is, in the foregoing abnormality diagnosis apparatus, the degree of reduction in the abnormality determination thresholds is higher than the degree of reduction in the misfire determination thresholds when the stop process is performed. Therefore, the catalyst abnormality diagnosis that reflects the accumulation of damage in the exhaust gas control apparatus resulting from the generation of heat through the supply of oxygen from the cylinder or cylinders to which the supply of fuel is stopped in addition to excluding the cylinder or cylinders to which the supply of fuel is stopped from the targets for detection of a misfire can be realized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is an illustrative view of map data on a permissible misfire rate that is referred to when a stop process is not performed;

FIG. 8 is an illustrative view of map data on the permissible misfire rate that are referred to when the stop process is performed.

DETAILED DESCRIPTION OF EMBODIMENTS

An engine control unit 300 that is one of the embodiments of an abnormality diagnosis apparatus for an internal combustion engine will be described hereinafter with reference to FIGS. 1 to 9.

<As for Configuration of Vehicle 10>

Figure 1:
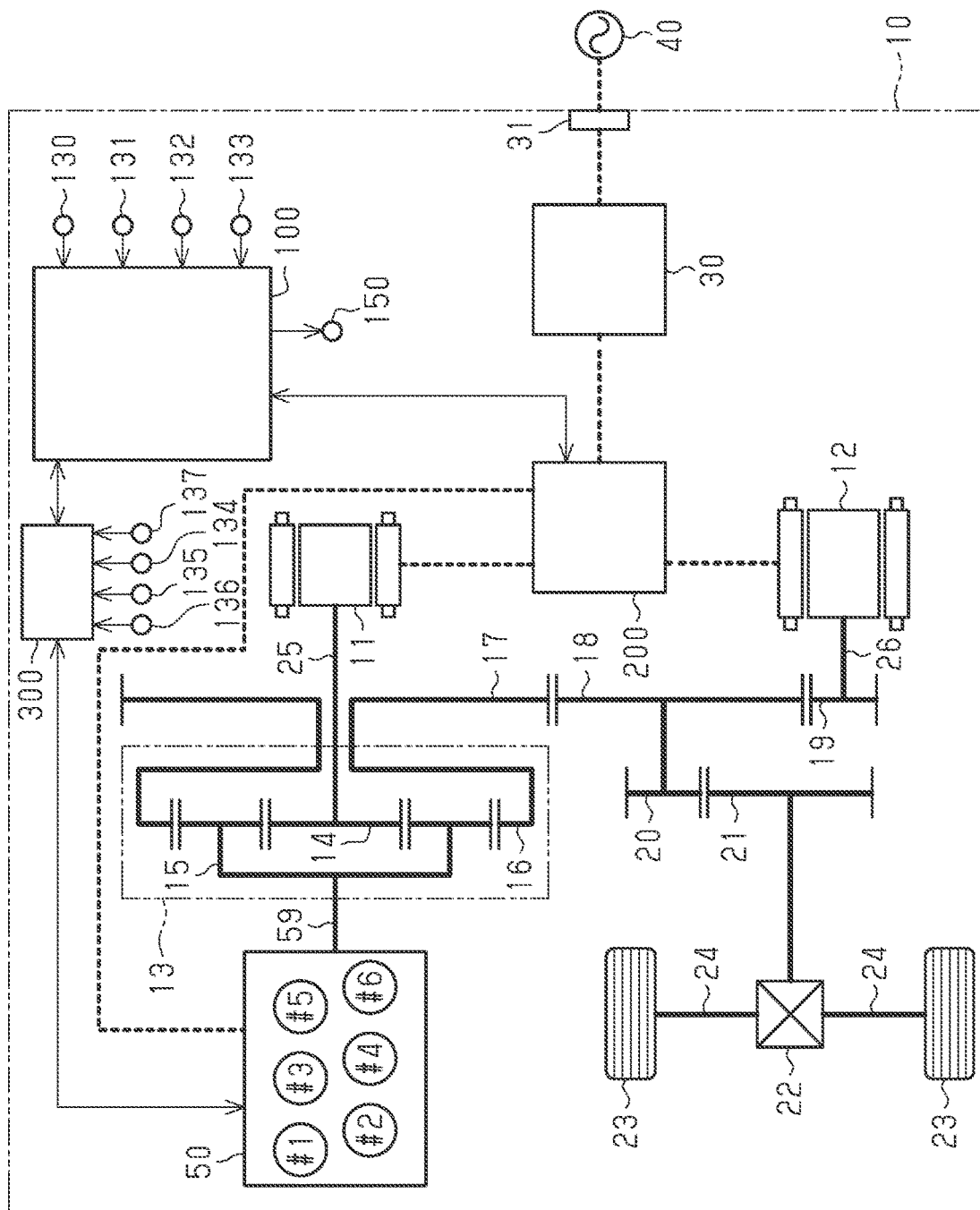
FIG. 1 is a schematic view showing the configuration of a hybrid electric vehicle that is equipped with an engine control unit as one of the embodiments of an abnormality diagnosis apparatus.

As shown in FIG. 1, a vehicle 10 is equipped with an engine 50. The engine 50 is a six-cylinder engine equipped with six cylinders #1 to #6 as shown in FIG. 1. Incidentally, the engine 50 is provided with port injection valves that inject fuel into intake ports respectively, and in-cylinder injection valves that inject fuel into combustion chambers respectively. Besides, a mixture of air and fuel in the combustion chambers is used for combustion as sparks are discharged by ignition plugs respectively. The combustion energy generated at that time is converted into rotational energy of a crankshaft 59 that is an output shaft of the engine 50. The air-fuel mixture used for combustion in the combustion chambers is discharged to an exhaust passage. The exhaust passage is provided with a three-way catalyst having an oxygen occlusion capacity, and a gasoline particulate filter (hereinafter referred to as the GPF). Incidentally, the GPF has a three-way catalyst carried on a filter that collects PM.

Besides, the vehicle 10 is equipped with a battery 30 that accumulates electric power. Furthermore, the vehicle 10 is equipped with a first motor-generator 11 and a second motor-generator 12. Each of the first motor-generator 11 and the second motor-generator 12 is a motor that generates a driving force as electric power is fed thereto from the battery 30, and also functions as a generator that generates electric power with which the battery 30 is charged, upon receiving motive power from the outside.

Furthermore, the vehicle 10 is provided with a planetary gear mechanism 13 having three rotary elements, namely, a sun gear 14, a planetary carrier 15, and a ring gear 16. The crankshaft 59 is coupled to the planetary carrier 15 of the planetary gear mechanism 13. Moreover, a first input shaft 25 coupled to a rotary shaft of the first motor-generator 11 is coupled to the sun gear 14 of the planetary gear mechanism 13. Besides, the ring gear 16 of the planetary gear mechanism 13 is integrally provided with a counter drive gear 17. A counter driven gear 18 is meshed with the counter drive gear 17. Moreover, a reduction gear 19 is meshed with the counter driven gear 18. A second input shaft 26 coupled to a rotary shaft of the second motor-generator 12 is coupled to the reduction gear 19.

Besides, a final drive gear 20 is integrally rotatably coupled to the counter driven gear 18. A final driven gear 21 is meshed with the final drive gear 20. Moreover, drive shafts 24 of driving wheels 23 are coupled to the final driven gear 21 via a differential mechanism 22.

<As for System Control Unit 100>

A system control unit 100 is equipped with a storage device in which programs are stored, and a processing circuitry that executes the programs stored in the storage device to perform various kinds of control. The system control unit 100 is connected to a power control unit 200 and the engine control unit 300.

<As for Power Control Unit 200>

The first motor-generator 11 and the second motor-generator 12 are connected to the battery 30 via the power control unit 200. The power control unit 200 includes a control circuit, an inverter, and a converter. The power control unit 200 behaves based on a command from the system control unit 100. The power control unit 200 then adjusts the amount of electric power fed from the battery 30 to the first motor-generator 11 and the second motor-generator 12, and the amount of electric power with which the battery 30 is charged from the first motor-generator 11 and the second motor-generator 12. Incidentally, the vehicle 10 is provided with a connector 31 that can be connected to an external electric power supply 40. Therefore, the battery 30 can also be charged with the electric power supplied from the external electric power supply 40. That is, the vehicle 10 is a plug-in hybrid electric vehicle.

<As for Engine Control Unit 300>

The engine control unit 300 controls the engine 50 based on a command from the system control unit 100. The engine control unit 300 is equipped with a storage device in which programs are stored, and a processing circuitry that executes the programs stored in the storage device to perform various kinds of control.

Detection signals of various sensors that detect an operating state of the engine 50 are input to the engine control unit 300. The sensors from which the detection signals are input to the engine control unit 300 include a crank position sensor 134 that detects a rotational angle of the crankshaft 59.

Figure 2:
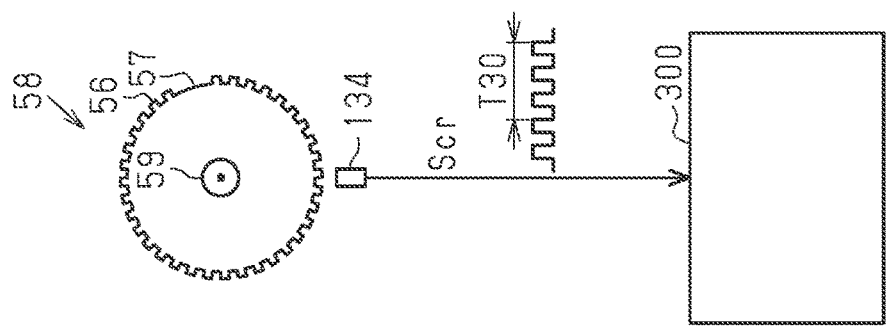
FIG. 2 is a schematic view illustrating a crank angle signal.

As shown in FIG. 2, a crank rotor 58 is attached to the crankshaft 59. The crank rotor 58 is provided with 34 teeth 56 arranged at equal intervals, but is provided with a single tooth lacking portion 57 located between the adjacent teeth 56 that are widely spaced apart from each other. The crank position sensor 134 is provided toward a peripheral edge portion of the crank rotor 58 in such a manner as to face the teeth 56 of the crank rotor 58.

The crank position sensor 134 is a magnetic resistance element-type sensor that is constituted of a magnet and a sensor circuit with a built-in magnetic resistance element. When the crank rotor 58 rotates as the crankshaft 59 rotates, the teeth 56 of the crank rotor 58 and the crank position sensor 134 move toward and away from each other accordingly. Thus, the direction of a magnetic field regarding the magnetic resistance element in the crank position sensor 134 changes, and the internal resistance of the magnetic resistance element changes. The sensor circuit makes a comparison on a relationship in magnitude between a waveform obtained by converting changes in this resistance value into a voltage and a threshold, shapes the waveform into a rectangular wave with Lo signals and Hi signals, and outputs the shaped waveform as a crank angle signal Scr.

In concrete terms, as shown in FIG. 2, the crank position sensor 134 outputs a Lo signal when facing each of the teeth 56. Then, the crank position sensor 134 outputs a Hi signal when facing each of void regions between the teeth 56. Therefore, when a Hi signal corresponding to the tooth lacking portion 57 is detected, a Lo signal corresponding to the tooth 56 is then detected. After that, Lo signals corresponding to the teeth 56 are detected at intervals of 10° C.A. After 34 Lo signals are thus detected, a Hi signal corresponding to the tooth lacking portion 57 is detected again. Therefore, the rotational angle until detection of a Lo signal corresponding to the next tooth 56 via the Hi signal corresponding to the tooth lacking portion 57 is equal to a crank angle of 30° C.A.

Moreover, the interval from detection of a Lo signal corresponding to the tooth 56 following the Hi signal corresponding to the tooth lacking portion 57 to detection of a next Lo signal following the Hi signal corresponding to the tooth lacking portion 57 is equal to a crank angle of 360° C.A.

The engine control unit 300 calculates a crank angle based on the crank angle signal Scr. Besides, the engine control unit 300 calculates a time T30 needed for the crank angle to change by a certain amount, as an index value of a rotational fluctuation amount of the crankshaft 59. A period equivalent to T30 is depicted in FIG. 2. T30 denotes a time needed for the crank angle to change by 30° C.A.

The engine control unit 300 calculates an engine rotational speed NE that is a rotational speed of the crankshaft 59, based on the crank angle signal Scr input from the crank position sensor 134.

Besides, an airflow meter 135 that detects an intake air amount Ga and an intake air temperature THA in the engine 50 is connected to the engine control unit 300. Furthermore, a coolant temperature sensor 136 that detects a coolant temperature THW that is a temperature of coolant for the engine 50 is also connected to the engine control unit 300. Besides, an exhaust gas pressure sensor 137 that detects a pressure Pex of exhaust gas flowing into the GPF is also connected to the engine control unit 300.

As shown in FIG. 1, a main switch 130 that is used by a driver of the vehicle 10 to make a changeover between activation and stop of a system of the vehicle 10 is connected to the system control unit 100. Besides, an accelerator position sensor 131 that detects an accelerator operation amount, and a brake sensor 132 that detects a brake operation amount are connected to the system control unit 100. Furthermore, a vehicle speed sensor 133 that detects a vehicle speed that is a speed of the vehicle 10 is connected to the system control unit 100.

Besides, a current, a voltage, and a temperature of the battery 30 are input to the power control unit 200. The power control unit 200 calculates a charging state index value SOC that is a ratio of a remaining charging amount of the battery 30 to a charging capacity of the battery 30, based on the current, the voltage, and the temperature.

Each of the engine control unit 300 and the power control unit 200 is connected to the system control unit 100. Moreover, the system control unit 100, the power control unit 200, and the engine control unit 300 exchange and share pieces of information based on the detection signals input from the sensors, and calculated pieces of information.

The system control unit 100 outputs a command to the engine control unit 300 based on these pieces of information, and controls the engine 50 through the engine control unit 300. Besides, the system control unit 100 outputs a command to the power control unit 200 based on these pieces of information. Thus, the system control unit 100 performs the control of the first motor-generator 11 and the second motor-generator 12, and charging control of the battery 30 through the power control unit 200. As described hitherto, the system control unit 100 controls the vehicle 10 by outputting the commands to the power control unit 200 and the engine control unit 300 respectively.

<As for Control of Vehicle 10>

Subsequently, the control of the vehicle 10 that is performed by the system control unit 100 will be described in more detail.

The system control unit 100 computes a required output that is a required value of an output of the vehicle 10, based on the accelerator operation amount and the vehicle speed. The system control unit 100 then decides a torque distribution to the engine 50, the first motor-generator 11, and the second motor-generator 12, in accordance with the required output, the charging state index value SOC of the battery 30, and the like. The system control unit 100 then controls the output of the engine 50, and power running and regeneration by the first motor-generator 11 and the second motor-generator 12. Incidentally, the system control unit 100 changes over the running mode of the vehicle 10 depending on the magnitude of the charging state index value SOC.

When the charging state index value SOC is higher than a certain level, the system control unit 100 selects a motor running mode in which the vehicle 10 runs by a driving force generated by the second motor-generator 12 and a driving force generated by the first motor-generator 11 without actuating the engine 50. That is, when there is enough room in the remaining charging amount of the battery 30, the system control unit 100 selects the motor running mode.

On the other hand, when the charging state index value SOC becomes equal to or lower than the certain level, the system control unit 100 selects a hybrid running mode in which the vehicle 10 runs using the engine 50 as well as the first motor-generator 11 and the second motor-generator 12.

Incidentally, even when the charging state index value SOC is higher than the certain level, the system control unit 100 selects the hybrid running mode in the following cases.

The hybrid running mode is selected when the vehicle speed is higher than an upper-limit vehicle speed of the motor running mode.

The hybrid running mode is also selected when a large output is temporarily required at the time of, for example, rapid acceleration with the accelerator operation amount being large, or when the engine 50 needs to be started.

When the hybrid running mode is selected, the system control unit 100 causes the first motor-generator 11 to function as a starter motor in starting the engine 50. In concrete terms, the system control unit 100 rotates the crankshaft 59 to start the engine 50, by rotating the sun gear 14 through the use of the first motor-generator 11.

Besides, when the hybrid running mode is selected, the system control unit 100 changes over the control at the time of stop of the vehicle 10 in accordance with the magnitude of the charging state index value SOC. In concrete terms, when the charging state index value SOC is equal to or higher than a threshold, the system control unit 100 stops the operation of the engine 50, and drives neither the first motor-generator 11 nor the second motor-generator 12. That is, the system control unit 100 stops the operation of the engine 50 and restrains idling operation in stopping the vehicle 10. Incidentally, when the charging state index value SOC of the battery 30 is lower than the threshold, the system control unit 100 operates the engine 50. The system control unit 100 then drives the first motor-generator 11 through the use of the output of the engine 50, and thus causes the first motor-generator 11 to function as a generator.

When the hybrid running mode is selected, the system control unit 100 changes over the control in accordance with the charging state index value SOC during running as well. If the charging state index value SOC of the battery 30 is equal to or higher than the threshold when the vehicle 10 starts running and runs with low load, the system control unit 100 causes the vehicle 10 to start running and to run only by a driving force generated by the second motor-generator 12. In this case, the engine 50 is stopped, and no electric power is generated by the first motor-generator 11. On the other hand, if the charging state index value SOC of the battery 30 is lower than the threshold when the vehicle 10 starts running and runs with low load, the system control unit 100 starts the engine 50, causes the first motor-generator 11 to generate electric power, and charges the battery 30 with the generated electric power. At this time, the vehicle 10 runs by part of the driving force of the engine 50 and the driving force of the second motor-generator 12. If the charging state index value SOC of the battery 30 is equal to or higher than the threshold when the vehicle 10 runs steadily, the system control unit 100 operates the engine 50 with high operating efficiency, and causes the vehicle 10 to run mainly through the use of the output of the engine 50. At this time, the motive power of the engine 50 is split into a motive power on the driving wheel 23 sides and a motive power on the first motor-generator 11 side via the planetary gear mechanism 13. Thus, the vehicle 10 runs with the first motor-generator 11 generating electric power. The system control unit 100 then drives the second motor-generator 12 with the generated electric power, and supplements the motive power of the engine 50 with the motive power of the second motor-generator 12. On the other hand, if the charging state index value SOC of the battery 30 is lower than the threshold when the vehicle 10 runs steadily, the system control unit 100 makes the engine rotational speed NE higher. The system control unit 100 then uses the electric power generated by the first motor-generator 11 to drive the second motor-generator 12, and charges the battery 30 with surplus electric power. Incidentally, at the time of acceleration, the system control unit 100 enhances the engine rotational speed NE, and uses the electric power generated by the first motor-generator 11 to drive the second motor-generator 12. Thus, the vehicle 10 is accelerated by the motive power of the engine 50 and the motive power of the second motor-generator 12. Then, at the time of deceleration, the system control unit 100 stops the operation of the engine 50. The system control unit 100 then causes the second motor-generator 12 to function as a generator, and charges the battery 30 with the generated electric power. In the vehicle 10, a resistance generated through this generation of electric power is utilized as a brake. This electric power generation control at the time of deceleration is referred to as regeneration control.

<Regeneration Control>

Figure 3:
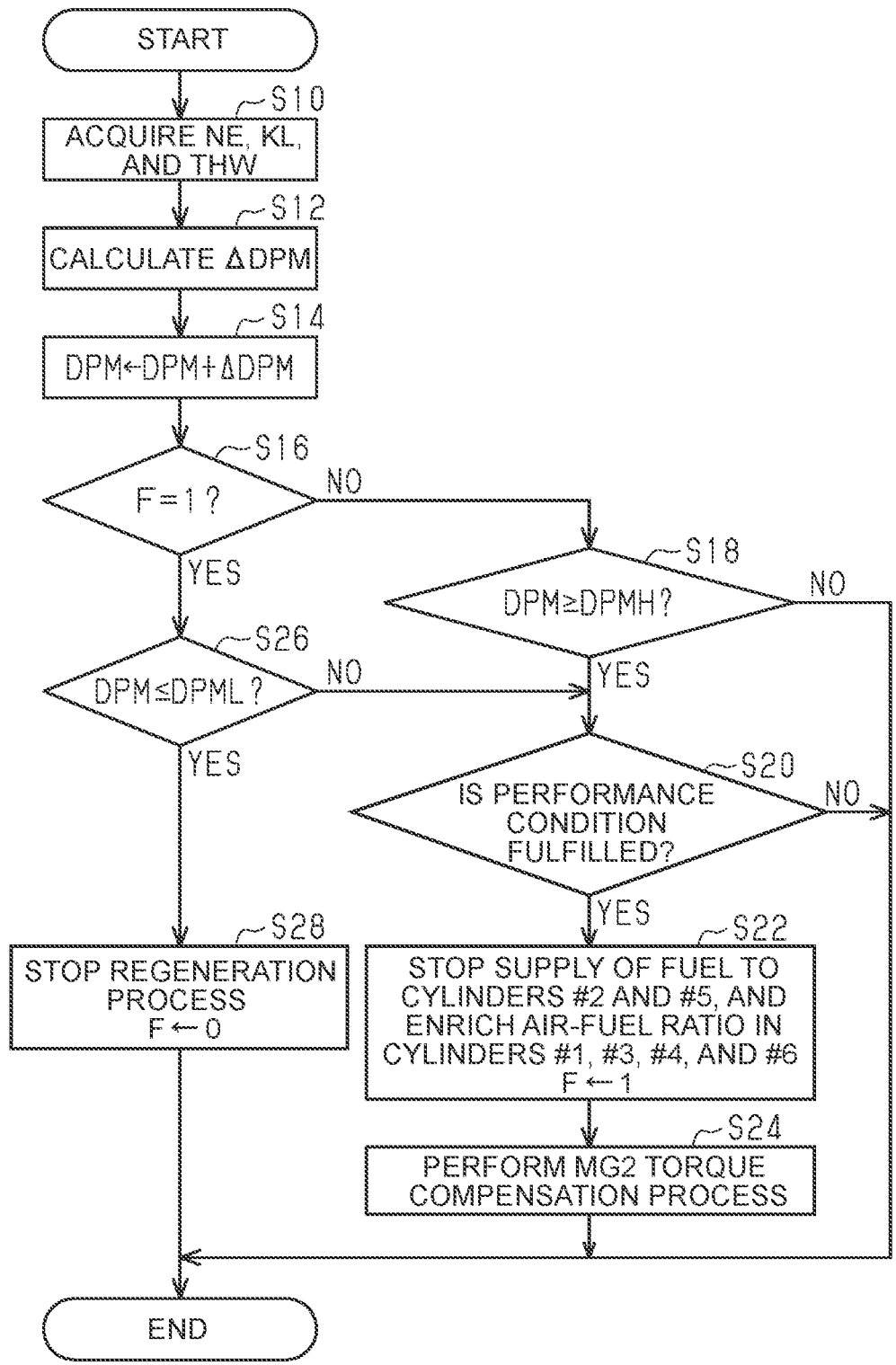
FIG. 3 is a flowchart showing the flow of a regeneration process in a routine regarding the process.

FIG. 3 shows a processing procedure in a routine regarding a regeneration process that is performed by the engine control unit 300. The routine shown in FIG. 3 is realized through repeated execution of a program stored in the storage device of the engine control unit 300 by the processing circuitry of the engine control unit 300 on a predetermined cycle. Incidentally, step numbers of processing steps will be denoted hereinafter by numbers preceded by "S" respectively.

In the routine shown in FIG. 3, the engine control unit 300 first acquires the engine rotational speed NE, an engine load factor KL, and the coolant temperature THW (S10). The engine load factor KL is calculated by the engine control unit 300 based on the intake air amount Ga and the engine rotational speed NE. Subsequently, the engine control unit 300 calculates an update amount ΔDPM of a deposition amount DPM, based on the engine rotational speed NE, the engine load factor KL, and the coolant temperature THW (S12). It should be noted herein that the deposition amount DPM is an amount of PM collected by the GPF. More specifically, the engine control unit 300 calculates an amount of PM in exhaust gas discharged to the exhaust passage, based on the engine rotational speed NE, the engine load factor KL, and the coolant temperature THW. Besides, the engine control unit 300 calculates a temperature of the GPF based on the engine rotational speed NE and the engine load factor KL. The engine control unit 300 then calculates the update amount ΔDPM based on the amount of PM in exhaust gas and the temperature of the GPF.

Subsequently, the engine control unit 300 adopts a sum obtained by adding the update amount ΔDPM to the deposition amount DPM, as the new deposition amount DPM. The engine control unit 300 updates the deposition amount DPM in this manner (S14). Subsequently, the engine control unit 300 determines whether or not a flag F is "1" (S16). When being "1", the flag F indicates that the regeneration process for removing PM in the GPF through combustion is performed. On the other hand, when being "0", the flag F indicates that the regeneration process is not performed. If it is determined that the flag F is "0" (NO in S16), the engine control unit 300 determines whether or not the deposition amount DPM is equal to or larger than a regeneration performance value DPMH (S18). The regeneration performance value DPMH is a threshold for determining that the PM needs to be removed, on the grounds that the deposition amount DPM is equal to or larger than the regeneration performance value DPMH.

If it is determined that the deposition amount DPM is equal to or larger than the regeneration performance value DPMH (YES in S18), the engine control unit 300 determines whether or not a condition for performing the regeneration process is fulfilled (S20). It should be noted herein that the performance condition may be a condition that the logical product of the following conditions (i) to (iii) is true.

The condition (i) is that an engine torque command value Te* that is a command value for the torque of the engine 50 is equal to or larger than a predetermined value Teth.

The condition (ii) is that the engine rotational speed NE is equal to or higher than a predetermined speed.

The condition (iii) is a condition that a torque compensation process of S24 can be performed.

If it is determined that the logical product is true (YES in S20), the engine control unit 300 performs the regeneration process, and assigns "1" to the flag F (S22). That is, the engine control unit 300 stops the injection of fuel from the port injection valves and in-cylinder injection valves of the cylinders #2 and #5. The engine control unit 300 then makes the air-fuel ratio of the air-fuel mixture in the combustion chambers of the cylinders #1, #3, #4, and #6 richer than a theoretical air-fuel ratio. That is, the regeneration process is a stop process for stopping the supply of fuel to one or some of a plurality of cylinders and supplying fuel to the other cylinders or cylinder. Incidentally, in the engine 50, the supply of fuel to two of the cylinders is stopped. The regeneration process is a process for removing the PM collected by the GPF through combustion by discharging oxygen and unburnt fuel to the exhaust passage to raise the temperature of the GPF. The stop process is performed to supply oxygen to the three-way catalyst that is an exhaust gas control apparatus and the GPF. The engine control unit 300 burns unburnt fuel in the three-way catalyst and the like and raises the temperature of exhaust gas by discharging oxygen and unburnt fuel to the exhaust passage. Thus, the temperature of the GPF can be raised. Besides, the PM collected by the GPF can be removed through combustion by supplying oxygen to the GPF.

Incidentally, the cylinders to which the supply of fuel is stopped may not necessarily be the cylinders #2 and #5. For example, the cylinders to which the supply of fuel is stopped may be sequentially changed over such that the number of times of the stop of fuel supply does not differ among the cylinders.

The engine control unit 300 performs a process of compensating for fluctuations in the torque of the crankshaft 59 of the engine 50 resulting from the stop of combustion control in the cylinders #2 and #5 (S24). In this process, the engine control unit 300 outputs a command for the power control unit 200. Upon receiving this command, the power control unit 200 superimposes a compensation torque on a required torque for running for the second motor-generator 12. The power control unit 200 then operates the inverter based on the required torque on which the compensation torque is superimposed.

Incidentally, the condition that the torque compensation process can be performed includes that there is no abnormality in the second motor-generator 12, that an electric power needed to perform the torque compensation process is accumulated in the battery 30, and the like.

On the other hand, if it is determined that the flag F is "1" (YES in S16), the engine control unit 300 determines whether or not the deposition amount DPM is equal to or smaller than a stop threshold DPML (S26). The stop threshold DPML is a threshold for determining that the regeneration process may be stopped on the grounds that the deposition amount DPM is equal to or smaller than the stop threshold DPML. If the deposition amount DPM is equal to or smaller than the stop threshold DPML (YES in S26), the engine control unit 300 stops the regeneration process, and assigns "0" to the flag F (S28).

Incidentally, when the processing of S24 and S28 is completed or when the result of the determination in the processing of S18 and S20 is negative, the engine control unit 300 temporarily ends the routine shown in FIG. 3.

<As for Misfire Detection Process>

Figure 4:
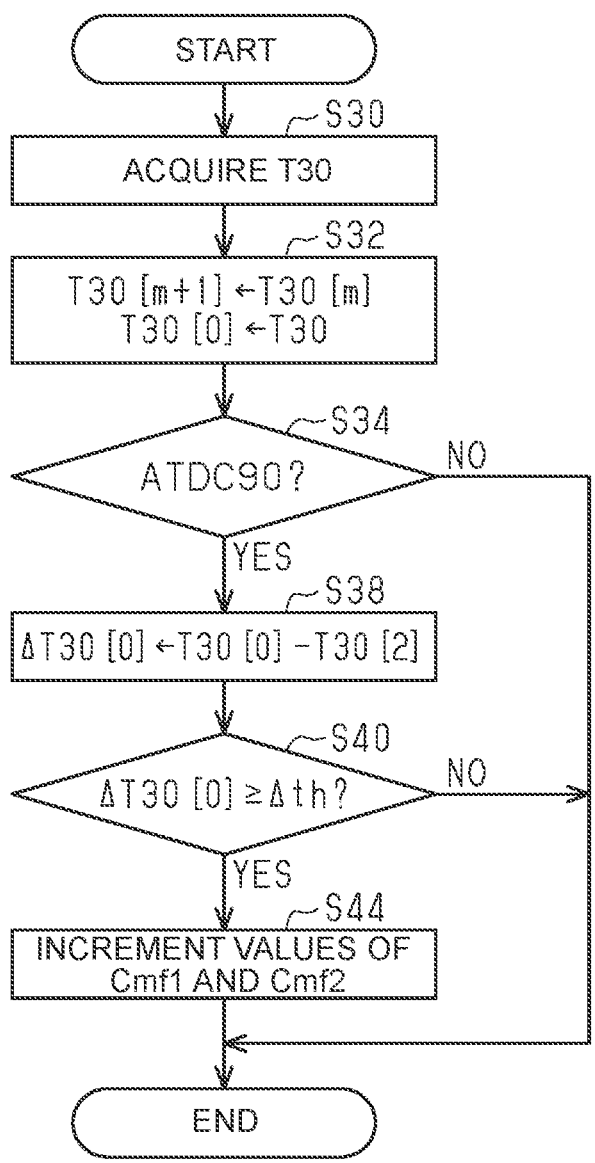
FIG. 4 is a flowchart showing the flow of a misfire detection process in a routine regarding the process.

FIG. 4 shows a processing procedure in a routine regarding a misfire detection process that is performed by the engine control unit 300. The routine shown in FIG. 4 is realized through repeated execution of a program stored in the storage device of the engine control unit 300 by the processing circuitry of the engine control unit 300 on a predetermined cycle.

In a series of processing steps shown in FIG. 4, the engine control unit 300 first acquires T30 that is a time needed for the crankshaft 59 to rotate by 30° C.A (S30). T30 is calculated through measurement of a time for rotation of the crankshaft 59 by 30° C.A based on the crank angle signal Scr, by the engine control unit 300. Subsequently, the engine control unit 300 assigns T30[m] to T30[m+1] on the assumption that "m=0, 1, 2, 3, . . . ", assigns T30 newly acquired in the processing of S30 to T30[0], and stores these values into the storage device (S32). This processing is designed to increase the variable in the parentheses following T30 as T30 goes back into the past. By means of this processing, when the variable in the parentheses following T30 increases by 1, T30 means a time preceding T30 before the increase in the variable by 30° C.A.

Subsequently, the engine control unit 300 determines whether or not the current rotational angle of the crankshaft 59 is ATDC90° C.A with respect to the compression top dead center in one of the cylinders #1 to #6 (S34). If it is determined that the current rotational angle of the crankshaft 59 is ATDC90° C.A (YES in S34), the engine control unit 300 regards one of the cylinders as a target for determining the presence or absence of a misfire, and calculates a rotational fluctuation amount ΔT30[0] in the cylinder as the target for determination (S38). More specifically, the engine control unit 300 subtracts T30[2] from the newest T30[0]. It should be noted herein that T30[0] is a time required for rotation of the crankshaft 59 from ATDC60° C.A in the cylinder as the target for determination by 30° C.A. Therefore, when there is no misfire, T30[0] is shorter than T30[2], so the rotational fluctuation amount ΔT30[0] is negative. In contrast, when a misfire occurs, the rotational fluctuation amount ΔT30[0] is positive.

The engine control unit 300 determines whether or not the rotational fluctuation amount ΔT30[0] is equal to or larger than a fluctuation amount threshold Δth (S40). The rotational fluctuation amount ΔT30[0] is a piece of information on fluctuations in the engine rotational speed NE. The processing of S40 is a misfire detection process for determining, based on the piece of information on fluctuations in the engine rotational speed NE, whether or not a misfire has occurred in the cylinder as the target for determination. For example, the engine control unit 300 may variably set the fluctuation amount threshold Δth in accordance with the engine rotational speed NE and the engine load factor KL.

If it is determined that the rotational fluctuation amount ΔT30[0] is equal to or larger than the fluctuation amount threshold Δth (YES in S40), the engine control unit 300 determines that a misfire has occurred, and increments the value of a misfire counter (S44). Incidentally, the misfire counter counts the number of times of detection of a misfire through the misfire detection process. That is, the processing of S44 is a count process for counting the number of times of detection of a misfire through the misfire detection process. In the processing of S44, the engine control unit 300 increments the values of a first misfire counter Cmf1 and a second misfire counter Cmf2, each of which serves as the misfire counter. The first misfire counter Cmf1 is a misfire counter that is referred to in a catalyst abnormality diagnosis process that will be described later. The second misfire counter Cmf2 is a misfire counter that is referred to in a misfire abnormality diagnosis process that will be described later.

Incidentally, when the processing of S44 is completed or when the result of the determination in the processing of S34 and S40 is negative, the engine control unit 300 temporarily ends the series of processing steps shown in FIG. 4.

<As for Abnormality Diagnosis Processes>

The engine control unit 300 performs the abnormality diagnosis processes for diagnosing an abnormality resulting from a misfire in the engine 50. The engine control unit 300 performs the misfire abnormality diagnosis process and the catalyst abnormality diagnosis process as the abnormality diagnosis processes. The misfire abnormality diagnosis process is an abnormality diagnosis process for diagnosing a misfire abnormality based on the value of the second misfire counter Cmf2. Incidentally, the misfire abnormality mentioned herein means an abnormality with the frequency of the occurrence of a misfire in the engine 50 being higher than a permissible range. The catalyst abnormality diagnosis process is an abnormality diagnosis process for diagnosing a catalyst abnormality based on the value of the first misfire counter Cmf1. When the temperature of the exhaust gas control apparatus becomes too high, damage is accumulated in the exhaust gas control apparatus. The catalyst abnormality mentioned herein means a state where the level of damage accumulated in the exhaust gas control apparatus as a result of overheating is higher than a permissible range.

<As for Misfire Abnormality Diagnosis Process>

Figure 5:
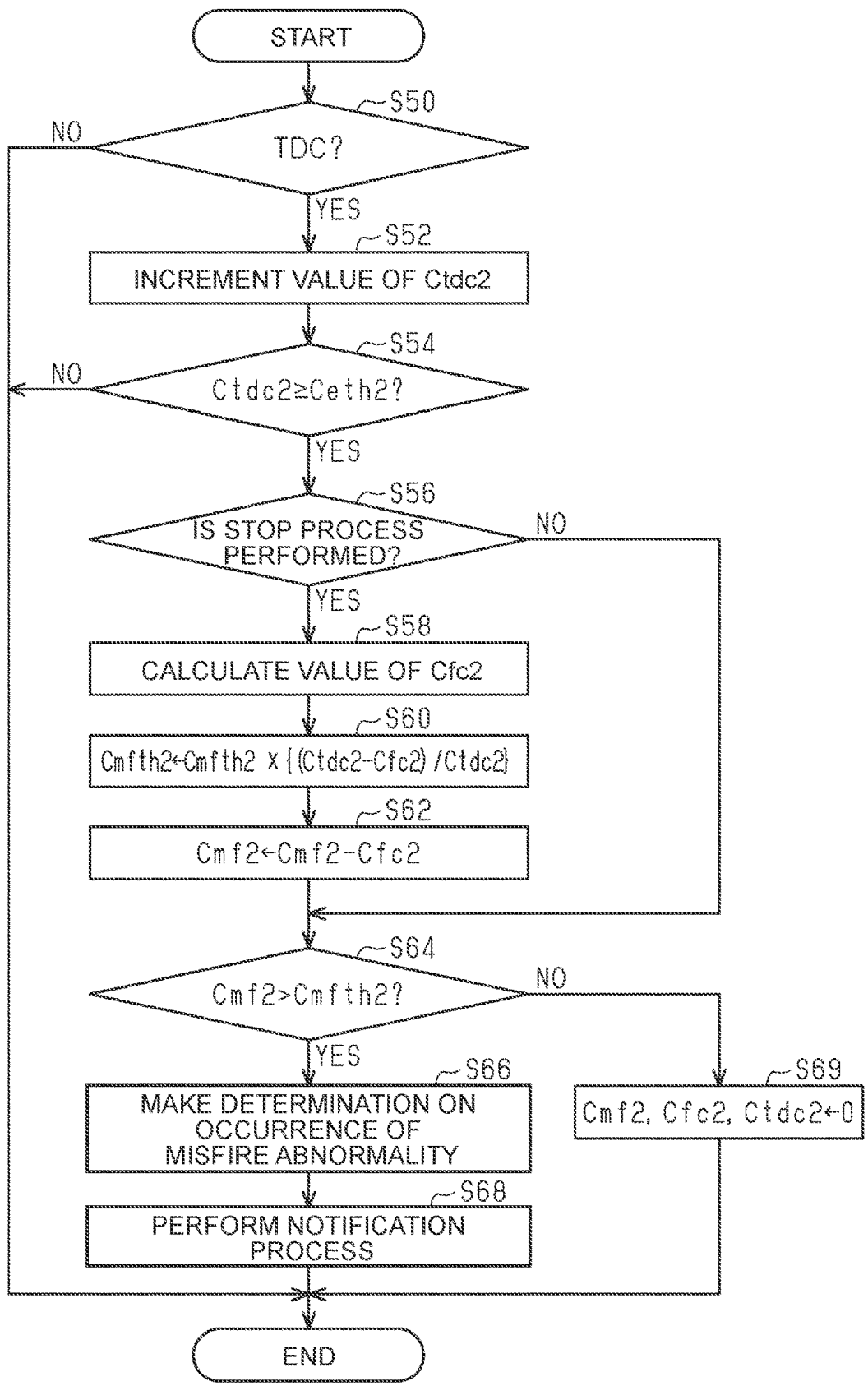
FIG. 5 is a flowchart showing the flow of a misfire abnormality diagnosis process in a routine regarding the process.

FIG. 5 shows a processing procedure in a routine regarding the misfire abnormality diagnosis process according to the present embodiment. The process shown in FIG. 5 is realized through repeated execution of a program stored in the engine control unit 300 by the processing circuitry of the engine control unit 300 on a predetermined cycle.

In a series of processing steps shown in FIG. 5, the engine control unit 300 first determines whether or not the compression top dead center, namely, TDC in one of the cylinders #1 to #6 has been reached (S50). If it is determined that the compression top dead center in one of the cylinders #1 to #6 has been reached (YES in S50), the engine control unit 300 increments the value of a second monitor counter Ctdc2 (S52).

After performing the processing of S52, the engine control unit 300 determines whether or not the value of the second monitor counter Ctdc2 is equal to or larger than a second prescribed value Ceth2 (S54). The second prescribed value Ceth2 is a threshold for determining that the engine 50 has been operated by a second prescribed amount on the grounds that the value of the second monitor counter Ctdc2 has become equal to or larger than the second prescribed value Ceth2.

If the result of the determination in the processing of S54 is positive (YES in S54), the engine control unit 300 determines whether or not the stop process has been performed (S56). In this case, the engine control unit 300 determines whether or not the stop process has been performed during the operation of the engine 50 by the second prescribed amount. That is, the result of the determination in the processing of S56 is positive if there is a period in which the stop process is performed even during part of the immediately preceding operation of the engine 50 by the second prescribed amount.

If the result of the determination in the processing of S56 is negative (NO in S56), the engine control unit 300 determines whether or not the value of the second misfire counter Cmf2 is equal to or larger than a misfire determination threshold Cmfth2 (S64). It should be noted herein that the misfire determination threshold Cmfth2 is set based on a lower limit of the number of times of the occurrence of a misfire larger than a permissible range in a period to the attainment of the second prescribed value Ceth2 by the number of times of the performance of combustion control involving the supply of fuel.

If it is determined that the value of the second misfire counter Cmf2 is larger than the misfire determination threshold Cmfth2 (YES in S64), the engine control unit 300 makes a misfire abnormality determination (S66). The misfire abnormality determination in S66 is a process for diagnosing that there is a misfire abnormality in the engine 50. The engine control unit 300 then performs a notification process (S68). In the notification process in S68, the engine control unit 300 outputs a command to the system control unit 100. Upon receiving the command, the system control unit 100 gives a notification that a misfire abnormality has been diagnosed, by operating a warning lamp 150 shown in FIG. 1.

On the other hand, if it is determined that the value of the second misfire counter Cmf2 is equal to or smaller than the misfire determination threshold Cmfth2 (NO in S64), the engine control unit 300 advances the process to S69. The engine control unit 300 then resets the values of the second misfire counter Cmf2, the second monitor counter Ctdc2, and a second stop counter Cfc2 that will be described later to "0" (S69).

Incidentally, when the processing of S68 and S69 is completed or when the result of the determination in the processing of S50 and S54 is negative, the engine control unit 300 temporarily ends the series of processing steps shown in FIG. 5.

By the way, if the result of the determination in the processing of S56 is positive (YES in S56), the engine control unit 300 calculates a value of the second stop counter Cfc2 (S58). The value of the second stop counter Cfc2 represents the number of times of the stop of fuel supply through the stop process during the immediately preceding operation of the engine 50 by the second prescribed amount. In the stop process, the supply of fuel to two of the six cylinders is stopped as described above. Thus, in the processing of S58, the engine control unit 300 calculates the value of the second stop counter Cfc2 by dividing the number of times of the arrival of a compression top dead center during the period of the performance of the stop process by 3. The engine control unit 300 then shifts to the processing of S60.

In the processing of S60, the engine control unit 300 assigns a product obtained by multiplying the misfire determination threshold Cmfth2 by "(Ctdc2−Cfc2)/Ctdc2" to the misfire determination threshold Cmfth2 (S60). The engine control unit 300 then shifts to the processing of S62. Incidentally, the processing of S60 is designed to correct the misfire determination threshold Cmfth2 by multiplying the misfire determination threshold Cmfth2 by a ratio of the number of times (Ctdc2−Cfc2) of fuel supply to the sum (Ctdc2) of the numbers of times of the arrival of a compression top dead center in all the cylinders during the operation of the engine 50 by the second prescribed amount.

In the processing of S62, the engine control unit 300 assigns a difference obtained by subtracting the value of the second stop counter Cfc2 from the value of the second misfire counter Cmf2 to the value of the second misfire counter Cmf2 (S62). The engine control unit 300 then shifts to the processing of S64. Incidentally, the processing of S62 is designed to carry out a correction of removing the number of times of the stop of fuel supply through the stop process (indicated by the second stop counter Cfc2) from the number of times of counting through the count process during the operation of the engine 50 by the second prescribed amount (indicated by the second misfire counter Cmf2).

The routine shown in FIG. 5 represents a misfire abnormality diagnosis process in which it is diagnosed that there is a misfire abnormality in the engine 50 when the value of the second misfire counter Cmf2 indicating the number of times of detection of a misfire during the operation of the engine 50 by the second prescribed amount is larger than the misfire determination threshold Cmfth2.

As described with reference to FIG. 5, the misfire abnormality diagnosis process of the present embodiment is designed to correct the value of the second misfire counter Cmf2 and the misfire determination threshold Cmfth2 if the stop process is performed during the operation of the engine 50 by the second prescribed amount (YES in S56) (S60, S62). Then, if the corrected value of the second misfire counter Cmf2 is larger than the corrected misfire determination threshold Cmfth2 (YES in S64), it is diagnosed that there is a misfire abnormality in the engine 50 (S66).

That is, when the stop process is performed, the engine control unit 300 that is an abnormality diagnosis apparatus carries out a correction of removing the number of times of the stop of fuel supply from the value of the second misfire counter Cmf2 in the misfire abnormality diagnosis process. Besides, the engine control unit 300 corrects the misfire determination threshold Cmfth2 in accordance with the ratio of actual fuel supply.

<As for Catalyst Abnormality Diagnosis Process>

Figure 6:
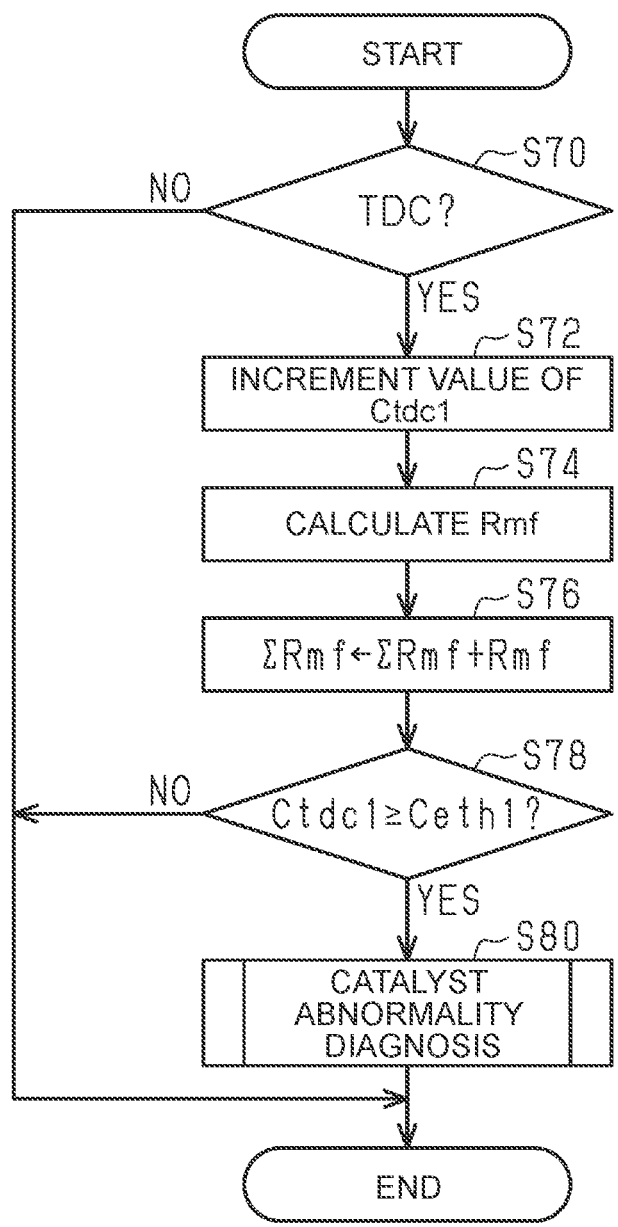
FIG. 6 is a flowchart showing the flow of a catalyst abnormality diagnosis process in a routine regarding the process.

FIG. 6 shows a processing procedure in a routine regarding the catalyst abnormality diagnosis process according to the present embodiment. The process shown in FIG. 6 is realized through repeated execution of a program stored in the engine control unit 300 by the processing circuitry of the engine control unit 300 on a predetermined cycle.

In a series of processing steps shown in FIG. 6, the engine control unit 300 first determines whether or not the compression top dead center in one of the cylinders #1 to #6, namely, TDC has been reached (S70). If it is determined that the compression top dead center in one of the cylinders has been reached (YES in S70), the engine control unit 300 increments the value of a first monitor counter Ctdc1 (S72).

Subsequently, the engine control unit 300 calculates a permissible misfire rate Rmf. The permissible misfire rate Rmf is an upper limit of a range of the misfire rate in which no catalyst abnormality is caused in the exhaust gas control apparatus through heating. The engine control unit 300 calculates the permissible misfire rate Rmf based on the engine rotational speed NE and the engine load factor KL.

Map data including the engine load factor KL and the engine rotational speed NE as input variables and the permissible misfire rate Rmf as an output variable are stored in the storage device of the engine control unit 300. The engine control unit 300 calculates the permissible misfire rate Rmf through the use of the map data. Incidentally, the map data are set data on discrete values of the input variables and values of the output variable corresponding to the values of the input variables respectively. Besides, map computation is designed to, for example, adopt the corresponding value of the output variable in the map data as a computation result when the values of the input variables coincide with any of the values of the input variables in the map data. In contrast, map computation may be a process of adopting a value obtained through interpolation of a plurality of values of the output variable included in the map data as a computation result when the values of the input variables do not coincide with any of the values of the input variables in the map data.

The map data will now be described with reference to FIG. 7 and FIG. 8. First map data that are referred to when the stop process is not performed, and second map data that are referred to when the stop process is performed are stored in the storage device of the engine control unit 300.

As shown in FIG. 7, the permissible misfire rate Rmf corresponding to the combination of the engine load factor KL and the engine rotational speed NE is stored in the first map data. Incidentally, in the example shown in FIG. 7, the engine load factor KL and the permissible misfire rate Rmf are expressed in percentage (%). The permissible misfire rate Rmf calculated through the use of these map data is a permissible misfire rate at the time when the engine 50 is in steady operation with the engine load factor KL and the engine rotational speed NE remaining unchanged. These map data are created by adapting the values of the output variable to the input variables respectively based on a result of an experiment conducted in advance or a simulation based on a model.

As shown in FIG. 8, the permissible misfire rate Rmf corresponding to the combination of the engine load factor KL and the engine rotational speed NE is stored in the second map data as well as the first map data. In the second map data, values smaller than the values of the permissible misfire rate Rmf in the first map data are stored as the output variable. In concrete terms, the output variable in the second map data is made smaller than in the first map data, by subtracting "33(%)" from the output variable in the first map data. This is because the permissible misfire rate Rmf is calculated while regarding each of the cylinders to which the supply of fuel is stopped as equivalent to a misfired cylinder when the stop process is performed. When the stop process is performed, air is introduced into the exhaust gas control apparatus from each of the cylinders to which the supply of fuel is stopped. Therefore, the temperature of the exhaust gas control apparatus rises as in the case where a misfire has occurred. As described above, the supply of fuel to two of the six cylinders is stopped in the stop process in the engine 50. Thus, in the present embodiment, each of the two cylinders to which the supply of fuel is stopped is regarded as equivalent to a misfired cylinder, and the output variable is reduced by subtracting "33(%)" corresponding to two sixths from the output variable in the first map data. Incidentally, the values in a meshed range in FIG. 8 are all "5(%)". Thus, the lower limit of the output variable is "5(%)" in the second map data. For example, when the permissible misfire rate Rmf is reduced too much to, for example, "0(%)", it is too often diagnosed that there is a catalyst abnormality in the catalyst abnormality diagnosis process. The lower limit of the output variable is set as "5(%)" to avoid such circumstances.

When the permissible misfire rate Rmf is calculated after selecting the first map data or the second map data depending on whether or not the stop process is performed, the engine control unit 300 calculates an integrated permissible misfire rate ΣRmf (S76). In concrete terms, the engine control unit 300 adds the permissible misfire rate Rmf calculated in the processing of S74 to the integrated permissible misfire rate ΣRmf. The engine control unit 300 then stores the sum into the storage device as the new integrated permissible misfire rate ΣRmf Incidentally, the integrated permissible misfire rate ΣRmf is a value used to calculate an average permissible misfire rate Rmf_ave in the processing of S84 or S87 that will be described later. The integrated permissible misfire rate ΣRmf is reset to "0" every time the average permissible misfire rate Rmf_ave is calculated in the processing of S84 or S87.

When the integrated permissible misfire rate ΣRmf is calculated (S76), the engine control unit 300 subsequently determines whether or not the value of the first monitor counter Ctdc1 is equal to or larger than a first prescribed value Ceth1 (S78). The first prescribed value Ceth1 is a threshold for determining that the engine 50 has been operated by a first prescribed amount on the grounds that the value of the first monitor counter Ctdc1 has become equal to or larger than the first prescribed value Ceth1. Incidentally, the first prescribed value Ceth1 is smaller than the second prescribed value Ceth2. That is, the first prescribed amount is smaller than the second prescribed amount.

If the result of the determination in the processing of S78 is positive (YES in S78), the engine control unit 300 performs the catalyst abnormality diagnosis process (S80).

Figure 9:
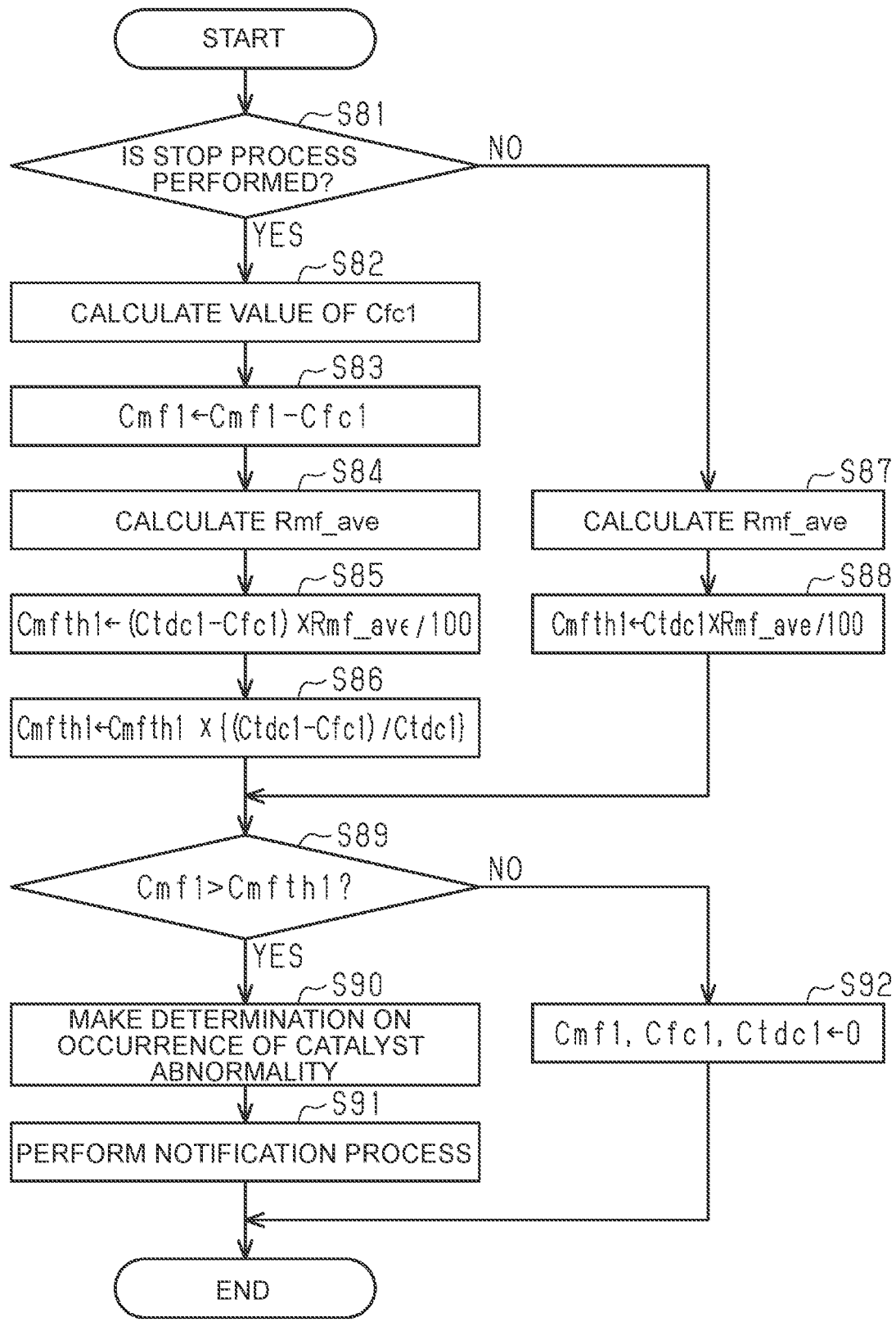
FIG. 9 is a flowchart showing the flow of the catalyst abnormality diagnosis process.

As shown in FIG. 9, when the catalyst abnormality diagnosis process is started, the engine control unit 300 determines whether or not the stop process has been performed (S81). In this case, the engine control unit 300 determines whether or not the stop process has been performed during the operation of the engine 50 by the first prescribed amount. That is, the result of the determination in the processing of S81 is positive when there is a period in which the stop process is performed even during part of the immediately preceding operation of the engine 50 by the first prescribed amount.

If the result of the determination in the processing of S81 is negative (NO in S91), the engine control unit 300 calculates the average permissible misfire rate Rmf_ave (S87). In concrete terms, the engine control unit 300 calculates the average permissible misfire rate Rmf_ave by dividing the integrated permissible misfire rate ΣRmf stored in the storage device by the first prescribed value Ceth1. That is, the average permissible misfire rate Rmf_ave is a quotient obtained by dividing the integrated permissible misfire rate ΣRmf by the first prescribed value Ceth1. Upon calculating the average permissible misfire rate Rmf_ave as described above, the engine control unit 300 sets the integrated permissible misfire rate ΣRmf to "0".

Subsequently, the engine control unit 300 calculates an abnormality determination threshold Cmfth1 (S88). In concrete terms, the engine control unit 300 calculates the abnormality determination threshold Cmfth1 by dividing a product obtained by multiplying the first prescribed value Ceth1 by the average permissible misfire rate Rmf_ave by 100. The calculated value is obtained by multiplying the average permissible misfire rate Rmf_ave by the number of times of a combustion stroke in which fuel is supplied during the operation of the engine 50 by the prescribed amount. That is, this is a process of converting the average permissible misfire rate Rmf_ave into the number of times of permission of a misfire in operating the engine 50 by the first prescribed amount.

The engine control unit 300 then determines whether or not the value of the first misfire counter Cmf1 is larger than the abnormality determination threshold Cmfth1 (S89). If it is determined that the value of the first misfire counter Cmf1 is larger than the abnormality determination threshold Cmfth1 (YES in S89), the engine control unit 300 makes a catalyst abnormality determination (S90). The catalyst abnormality determination in S90 is a process of diagnosing that there is a catalyst abnormality in the engine 50. The engine control unit 300 then performs the notification process (S91). In the notification process in S91, the engine control unit 300 outputs a command to the system control unit 100. Upon receiving the command, the system control unit 100 gives a notification that the occurrence of a catalyst abnormality has been diagnosed, by operating the warning lamp 150 shown in FIG. 1.

On the other hand, if it is determined that the value of the first misfire counter Cmf1 is equal to or smaller than the abnormality determination threshold Cmfth1 (NO in S89), the engine control unit 300 advances the process to S92. The engine control unit 300 then resets the values of the first misfire counter Cmf1, the first monitor counter Ctdc1, and a first stop counter Cfc1 that will be described later to "0" (S92).

Incidentally, when the processing of S91 and S92 is completed, the engine control unit 300 ends the catalyst abnormality diagnosis process. Then the engine control unit 300 temporarily ends the series of processing steps shown in FIG. 6. Besides, the engine control unit 300 also ends the series of processing steps shown in FIG. 6 if the result of the determination in the processing of S70 and S78 shown in FIG. 6 is negative.

If the result of the determination in the processing of S81 is positive (YES in S81), the engine control unit 300 calculates a value of the first stop counter Cfc1 (S82). The value of the first stop counter Cfc1 indicates the number of times of the stop of fuel supply through the stop process during the immediately preceding operation of the engine 50 by the first prescribed amount. As described above, in the stop process, the supply of fuel to two of the six cylinders is stopped. Thus, the engine control unit 300 calculates the value of the first stop counter Cfc1 by dividing the number of times of the arrival of a compression top dead center during the period in which the stop process is performed by 3, in the processing of S82. The engine control unit 300 then shifts to the processing of S83.

In the processing of S83, the engine control unit 300 assigns a difference obtained by subtracting the value of the first stop counter Cfc1 from the value of the first misfire counter Cmf1 to the value of the first misfire counter Cmf1 (S83).

Subsequently, the engine control unit 300 calculates the average permissible misfire rate Rmf_ave (S84). The contents of the processing of S84 are identical to the contents of the processing of S87. However, the processing of S84 is performed when the stop process has been performed during the operation of the engine 50 by the first prescribed amount. Therefore, the integrated permissible misfire rate ΣRmf used in the processing of S84 includes the permissible misfire rate Rmf calculated through the use of the map data described with reference to FIG. 8. Therefore, the average permissible misfire rate Rmf_ave calculated through the processing of S84 tends to be lower than the average permissible misfire rate Rmf_ave calculated through the processing of S87.

Subsequently, the engine control unit 300 calculates the abnormality determination threshold Cmfth1 (S85). In concrete terms, the engine control unit 300 calculates the abnormality determination threshold Cmfth1 by dividing a product obtained by multiplying a difference obtained by subtracting the value of the first stop counter Cfc1 from the first prescribed value Ceth1 by the average permissible misfire rate Rmf_ave, by 100, in the processing of S85.

The engine control unit 300 then assigns a product obtained by multiplying the abnormality determination threshold Cmfth1 by "(Ctdc1−Cfc1)/Ctdc1" to the abnormality determination threshold Cmfth1 (S86). The engine control unit 300 then shifts to the processing of S89. Incidentally, the processing of S86 is designed to carry out a correction of multiplying the abnormality determination threshold Cmfth1 by the ratio of the number of times (Ctdc1−Cfc1) of fuel supply to the sum (Ctdc1) of the numbers of times of the arrival of a compression top dead center in all the cylinders during the operation of the engine 50 by the first prescribed amount.

The engine control unit 300 then advances the process to S89.

<Operation of Present Embodiment>

A routine shown in FIG. 9 is a catalyst abnormality diagnosis process for diagnosing that there is a catalyst abnormality in the engine 50 when the value of the first misfire counter Cmf1 indicating the number of times of detection of a misfire during the operation of the engine 50 by the first prescribed amount is larger than the abnormality determination threshold Cmfth1.

As described with reference to FIG. 9, the catalyst abnormality diagnosis process of the present embodiment is designed to correct the value of the first misfire counter Cmf1 and the abnormality determination threshold Cmfth1 (S83, S86) if the stop process is performed during the operation of the engine 50 by the first prescribed amount (YES in S81). Then, if the corrected value of the first misfire counter Cmf1 is larger than the corrected abnormality determination threshold Cmfth1 (YES in S89), it is diagnosed that there is a catalyst abnormality in the engine 50 (S90).

That is, when the stop process is performed, the engine control unit 300 that is the abnormality diagnosis apparatus carries out a correction of removing the number of times of the stop of fuel supply from the value of the first misfire counter Cmf1, in the catalyst abnormality diagnosis process. Besides, the engine control unit 300 corrects the abnormality determination threshold Cmfth1 in accordance with the ratio of actual fuel supply.

Incidentally, the processing of S86 and the processing of S60 in the misfire abnormality diagnosis process are identical to each other in that the correction of multiplication by the ratio of the number of times of fuel supply to the sum of the numbers of times of the arrival of a compression top dead center in all the cylinders during the operation of the engine 50 by the prescribed amount is carried out when the stop process has been performed. However, in the case of the catalyst abnormality diagnosis process, the second map data with the output variable smaller than in the first map data are used in calculating the permissible misfire rate Rmf (S74) used to calculate the uncorrected abnormality determination threshold Cmfth1 (S85). Therefore, the uncorrected abnormality determination threshold Cmfth1 is smaller when the stop process has been performed than when the stop process has not been performed.

Thus, the engine control unit 300 carries out a diagnosis on the occurrence of a catalyst abnormality with the value of the first misfire counter Cmf1 being smaller when the stop process has been performed than when the stop process has not been performed during the operation of the engine 50 by the first prescribed amount.

Besides, as described above, in the catalyst abnormality diagnosis process, the uncorrected abnormality determination threshold Cmfth1 itself is smaller when the stop process has been performed than when the stop process has not been performed. The abnormality determination threshold Cmfth1 that is smaller than when the stop process has not been performed is further corrected by being multiplied by the ratio of the number of times of fuel supply to the sum of the numbers of times of the arrival of a compression top dead center in all the cylinders during the operation of the engine 50 by the prescribed amount. Therefore, the degree of reduction in the abnormality determination threshold Cmfth1 is higher than the degree of reduction in the misfire determination threshold Cmfth2 when the stop process has been performed than when the stop process has not been performed.

It should be noted herein that the abnormality determination threshold Cmfth1 in the case where the stop process has not been performed is referred to as a first abnormality determination threshold, and that the abnormality determination threshold Cmfth1 in the case where the stop process has been performed is referred to as a second abnormality determination threshold. Also, the misfire determination threshold Cmfth2 in the case where the stop process has not been performed is referred to as a first misfire determination threshold, and the misfire determination threshold Cmfth2 in the case where the stop process has been performed is referred to as a second misfire determination threshold. In this case, the quotient obtained by dividing the second abnormality determination threshold by the first abnormality determination threshold is smaller than the quotient obtained by dividing the second misfire determination threshold by the first misfire determination threshold.

<Effects of Present Embodiment>

(1) In the case where the stop process is performed, air is introduced through the stopped cylinders, so the temperature of the exhaust gas control apparatus rises through an oxidation reaction. Therefore, more damage resulting from overheating is accumulated in the exhaust gas control apparatus than in the case where the stop process is not performed, even when the number of times of the occurrence of a misfire is small.

The engine control unit 300 diagnoses that there is an abnormality in the exhaust gas control apparatus with the value of the first misfire counter Cmf1 being smaller when the stop process has been performed than when the stop process has not been performed. That is, the engine control unit 300 can perform the catalyst abnormality diagnosis process while reflecting the damage resulting from overheating through the stop process.

(2) The amount of damage accumulated in the exhaust gas control apparatus increases as the number of times of the stop of fuel supply through the stop process during the operation of the engine 50 by the first prescribed amount increases.

Thus, when the stop process is performed, the engine control unit 300 calculates the permissible misfire rate Rmf through the use of the second map data. Thus, the engine control unit 300 calculates the abnormality determination threshold Cmfth1 such that the abnormality determination threshold Cmfth1 decreases as the number of times of the stop of fuel supply increases. Therefore, the engine control unit 300 can realize the catalyst abnormality diagnosis process reflecting the accumulation of damage corresponding to the number of times of the stop of fuel supply.

(3) The engine control unit 300 performs the misfire abnormality diagnosis process in addition to the catalyst abnormality diagnosis. When the stop process is performed, a misfire may be erroneously detected on the assumption that there is a misfire in the cylinders to which the supply of fuel is stopped. As a result, it is determined that the frequency of the occurrence of a misfire is high, and it is erroneously diagnosed that there is a misfire abnormality. In contrast, when the stop process is performed, the engine control unit 300 carries out the correction of removing the number of times of the stop of fuel supply from the value of the second misfire counter Cmf2 counted through the count process, in the misfire abnormality diagnosis process. Besides, the engine control unit 300 carries out the correction of reducing the misfire determination threshold Cmfth2 in accordance with the ratio of actual fuel supply. Thus, the engine control unit 300 can adequately carry out a diagnosis on the occurrence of a misfire abnormality while reflecting that there is at least one cylinder to which the supply of fuel is stopped.

(4) In the misfire abnormality diagnosis process, a diagnosis on the occurrence of a misfire abnormality may be carried out while excluding the cylinders to which the supply of fuel is stopped from targets for detection of a misfire. On the other hand, the catalyst abnormality diagnosis process needs to reflect the accumulation of damage in the exhaust gas control apparatus resulting from the generation of heat through the supply of oxygen from the cylinders to which the supply of fuel is stopped, in addition to excluding the cylinders to which the supply of fuel is stopped from the targets for detection of a misfire.

In the engine control unit 300, when the stop process is performed, the degree of reduction in the abnormality determination threshold Cmfth1 is higher than the degree of reduction in the misfire determination threshold Cmfth2. Therefore, the catalyst abnormality diagnosis that reflects the accumulation of damage in the exhaust gas control apparatus resulting from the generation of heat through the supply of oxygen from the cylinders to which the supply of fuel is stopped, in addition to excluding the cylinders to which the supply of fuel is stopped from the targets for detection of a misfire can be realized.

Modification Examples

The present embodiment can be carried out after being modified as follows. The present embodiment and the following modification examples can be carried out in combination with one another within a range that does not cause any technical contradiction.

In the foregoing embodiment, the example of the six-cylinder engine has been presented. However, the abnormality diagnosis apparatus may not necessarily be applied to six-cylinder engines. Besides, the number of cylinders to which the supply of fuel is stopped in the stop process may not necessarily be two. For example, in the case where a stop process for stopping the supply of fuel to one of four cylinders is performed in a four-cylinder engine, second map data obtained by subtracting "25(%)" corresponding to one fourth from the output variables in map data equivalent to the first map data are prepared. Then, when the stop process is performed, the permissible misfire rate Rmf may be calculated through the use of the second map data. Incidentally, in the case where a stop process for stopping the supply of fuel to two of the four cylinders is performed, second map data obtained by subtracting "50(%)" corresponding to two fourths from the output variables in the map data equivalent to the first map data may be used. Incidentally, in the case where the number of cylinders to which the supply of fuel is stopped in the stop process fluctuates, each set of map data corresponding to the number of cylinders to which the supply of fuel is stopped may be prepared, and the permissible misfire rate Rmf may be calculated through the use of the set of map data corresponding to the number of stopped cylinders in each case.

The aspect in which the abnormality determination threshold Cmfth1 is calculated in such a manner as to decrease as the number of times of the stop of fuel supply through the stop process during the operation of the engine 50 by the first prescribed amount increases may not necessarily be the aspect presented in the foregoing embodiment. Instead of this aspect, it is acceptable to adopt an aspect that allows the abnormality determination threshold Cmfth1 to be calculated in such a manner as to decrease as the number of times of the stop of fuel supply through the stop process increases.

In the foregoing embodiment, the value obtained by subtracting T30[2] required for rotation in the section from TDC to ATDC30° C.A from T30[0] required for rotation in the section from ATDC60° C.A to ATDC90° C.A is adopted as the rotational fluctuation amount ΔT30. The rotational fluctuation amount ΔT30 may not necessarily be this value. For example, the rotational fluctuation amount ΔT30 may be a value obtained by subtracting T30 required for rotation in the section from TDC to ATDC30° C.A in the cylinder in which a compression top dead center has been reached on an immediately preceding cycle from T30 required for rotation in the section from TDC to ATDC30° C.A in the cylinder as a target for a determination on the occurrence of a misfire.

In the foregoing embodiment, the rotational fluctuation amount that is an amount of fluctuations in the rotational speed of the crankshaft 59 at a rotational angle interval that is equal to or smaller than an interval of the emergence of a compression top dead center is quantified by a difference between periods of time required for rotation at the rotational angle interval, but the disclosure is not limited thereto. The rotational fluctuation amount may be quantified by a ratio between the periods of time required for rotation at the rotational angle interval.

In the foregoing embodiment, the instantaneous speed variable that is a variable indicating the rotational speed of the crankshaft 59 at a rotational angle interval that is equal to or smaller than an interval of the emergence of a compression top dead center for determining the rotational fluctuation amount is quantified by the time required for rotation at the rotational angle interval, but the disclosure is not limited thereto. The instantaneous speed variable may be quantified by the speed.

The predetermined condition for permitting the performance of the regeneration process may not necessarily be that exemplified in the foregoing embodiment. For example, the predetermined condition may include only two of the foregoing three conditions (i) to (iii), or only one of the conditions (i) to (iii). Incidentally, the predetermined condition may include a condition or conditions other than the foregoing three conditions, or may not include any of the foregoing three conditions (i) to (iii).

The stop process may not necessarily be the regeneration process. The stop process may be, for example, a process of stopping the supply of fuel to one or some of the cylinders to adjust the output of the engine 50. Besides, the stop process may be, for example, a process of stopping combustion control in one or some of the cylinders in which there is an abnormality. Besides, the stop process may be, for example, a process of performing the control of stopping combustion control in only one or some of the cylinders and making the air-fuel ratio of the air-fuel mixture in the other cylinders or cylinder equal to the theoretical air-fuel ratio when the amount of oxygen occluded in the three-way catalyst is equal to or smaller than a prescribed value.

In the foregoing embodiment, the notification process through the use of the warning lamp 150 is performed when it is diagnosed that there is an abnormality. However, the notification process may not necessarily be designed to operate a device that outputs visual information. The notification process may be designed, for example, to operate a device that outputs audio information.

The utilization itself of the result of the abnormality diagnosis process for the notification process is not indispensable. For example, when it is diagnosed that there is a misfire abnormality, a process of operating the engine 50 to change the control of the engine 50 to an operating state where a misfire is unlikely to occur may be performed.

The process of estimating the deposition amount DPM may not necessarily be that exemplified in the foregoing embodiment. For example, the deposition amount DPM may be estimated based on a difference between pressures upstream and downstream of the GPF and the intake air amount Ga. In concrete terms, the deposition amount DPM may be estimated as a value that is larger when the difference between the pressures is large than when the difference between the pressures is small. Even in the case where the difference between the pressures remains unchanged, the deposition amount DPM may be estimated as a value that is larger when the intake air amount Ga is small than when the intake air amount Ga is large. It should be noted herein that the pressure Pex can be used instead of the difference between the pressures when the pressure downstream of the GPF is regarded as a constant value.

The GPF may not necessarily be the filter on which the three-way catalyst is carried, but may be a simple filter. Besides, the GPF may not necessarily be provided downstream of the three-way catalyst in the exhaust passage. Besides, it is not indispensable either to equip the exhaust gas control apparatus with the GPF. For example, even in the case where the exhaust gas control apparatus is configured solely as a three-way catalyst, it is effective to perform the processes exemplified in the foregoing embodiment and the modification examples thereof if the temperature of the exhaust gas control apparatus needs to be raised.

The example in which it is diagnosed that there is an abnormality on the grounds that the counted value of misfire is equal to or larger than the determination threshold when the value of the monitor counter becomes equal to or larger than the prescribed value has been presented. In contrast, the misfire rate may be calculated by dividing the counted value of misfire at the time when the value of the monitor counter becomes equal to or larger than the determination threshold by the determination threshold. That is, the occurrence of an abnormality may be diagnosed on the grounds that the misfire rate is equal to or higher than the threshold (misfire rate).

The vehicle 10 may not necessarily be a plug-in hybrid electric vehicle.

The vehicle 10 may be a hybrid electric vehicle that is not equipped with a configuration for external charging. Instead of a series parallel hybrid electric vehicle, the vehicle 10 may be, for example, a parallel hybrid electric vehicle or a series hybrid electric vehicle. As a matter of course, the vehicle 10 may be, for example, a vehicle having the engine 50 as the only motive power generation device, instead of a hybrid electric vehicle.

The system control unit 100 may perform the catalyst abnormality diagnosis process and the misfire abnormality diagnosis process to carry out a diagnosis on the occurrence of an abnormality. In this case, the system control unit 100 serves as the abnormality diagnosis apparatus.

In the foregoing embodiment, the engine control unit 300 that is the abnormality diagnosis apparatus performs the software processes. However, this is nothing more than an exemplification. For example, the abnormality diagnosis apparatus may be equipped with a dedicated hardware circuit (e.g., ASIC) that performs at least one or some of the software processes performed in the foregoing embodiment. That is, the abnormality diagnosis apparatus may be configured as indicated below by any one of (a) to (c). (a) The abnormality diagnosis apparatus is equipped with a processing circuitry that performs all the processes in accordance with programs, and a storage device that stores the programs. That is, the abnormality diagnosis apparatus is equipped with a software execution device. (b) The abnormality diagnosis apparatus is equipped with a processing circuitry that performs one or some of the processes in accordance with a program or programs, and a storage device. Furthermore, the abnormality diagnosis apparatus is equipped with a dedicated hardware circuit that performs the other processes or process. (c) The abnormality diagnosis apparatus is equipped with a dedicated hardware circuit that performs all the processes. It should be noted herein that there may be a plurality of software execution devices and/or a plurality of dedicated hardware circuits. That is, the foregoing processes can be performed by a processing circuitry equipped with at least either one or a plurality of software execution devices or one or a plurality of dedicated hardware circuits. The storage device that stores the programs, namely, a computer-readable medium includes all available media that can be accessed by a general-purpose or dedicated computer.

The expression "at least one" used in the present specification means "one or more" of desired alternatives. As an example, in the case where there are two alternatives, the expression "at least one" used in the present specification means "only one of the alternatives" or "both the alternatives". As another example, in the case where there are three or more alternatives, the expression "at least one" used in the present specification means "only one of the alternatives" or "a combination of any two or more of the alternatives".

What is claimed is:

1. An abnormality diagnosis apparatus for an internal combustion engine that has a plurality of cylinders and that allows performance of a stop process in which supply of fuel to at least one of the cylinders is stopped to supply oxygen to an exhaust gas control apparatus and fuel is supplied to the other cylinders or cylinder, the abnormality diagnosis apparatus being applied to the internal combustion engine and performing a misfire detection process in which occurrence of a misfire in each of the cylinders is detected based on information on fluctuations in an engine rotational speed, a count process in which a value of a misfire counter indicating the number of times of detection of a misfire through the misfire detection process is calculated, and a catalyst abnormality diagnosis process in which occurrence of an abnormality in the exhaust gas control apparatus is diagnosed based on the value of the misfire counter indicating the number of times of detection of a misfire during operation of the internal combustion engine by a prescribed amount, wherein the catalyst abnormality diagnosis process is configured to diagnose that there is an abnormality in the exhaust gas control apparatus with the value of the misfire counter being smaller when the stop process is performed during operation of the internal combustion engine by the prescribed amount than when the stop process is not performed during operation of the internal combustion engine by the prescribed amount.

2. The abnormality diagnosis apparatus according to claim 1 that carries out a correction of removing the number of times of stop of fuel supply through the stop process from the value of the misfire counter indicating the number of times of detection of a misfire during operation of the internal combustion engine by the prescribed amount, when the stop process is performed during operation of the internal combustion engine by the prescribed amount, and that calculates an abnormality determination threshold as a value that decreases as the number of times of stop of fuel supply through the stop process during operation of the internal combustion engine by the prescribed amount increases, wherein the catalyst abnormality diagnosis process is configured to diagnose that there is an abnormality in the exhaust gas control apparatus when the corrected value of the misfire counter is larger than the abnormality determination threshold.

3. The abnormality diagnosis apparatus according to claim 2, wherein the abnormality determination threshold is a value obtained by multiplying an average permissible misfire rate obtained by averaging permissible misfire rates calculated based on an engine load factor and an engine rotational speed upon every arrival of a compression top dead center during operation of the internal combustion engine by the prescribed amount, by the number of times of emergence of a combustion stroke in which fuel is supplied during operation of the internal combustion engine by the prescribed amount, and each of the permissible misfire rates calculated based on the engine load factor and the engine rotational speed is made lower when the stop process is performed than when the stop process is not performed.

4. The abnormality diagnosis apparatus according to claim 2 that performs a misfire abnormality diagnosis process in which occurrence of a misfire abnormality is diagnosed when a value of a second misfire counter that is the misfire counter indicating the number of times of detection of a misfire during operation of the internal combustion engine by a second prescribed amount is larger than a misfire determination threshold, in addition to the catalyst abnormality diagnosis process, wherein the misfire abnormality diagnosis process is configured to carry out a correction of removing the number of times of stop of fuel supply through the stop process from the value of the second misfire counter, and a correction of multiplying the misfire determination threshold by a ratio of the number of times of fuel supply to a sum of the numbers of times of arrival of a compression top dead center in all the cylinders during operation of the internal combustion engine by the second prescribed amount, when the stop process is performed during operation of the internal combustion engine by the second prescribed amount, and to diagnose that the misfire abnormality has occurred when the corrected value of the second misfire counter is larger than the corrected misfire determination threshold.

5. The abnormality diagnosis apparatus according to claim 4, wherein a quotient obtained by dividing a second abnormality determination threshold by a first abnormality determination threshold is smaller than a quotient obtained by dividing a second misfire determination threshold by a first misfire determination threshold, in a case where the first abnormality determination threshold represents the abnormality determination threshold when the stop process is not performed, the second abnormality determination threshold represents the abnormality determination threshold when the stop process is performed, the first misfire determination threshold represents the misfire determination threshold when the stop process is not performed, and the second misfire determination threshold represents the misfire determination threshold when the stop process is performed.

\* \* \* \* \*